United States Patent [19]

Bragd

[11] Patent Number: 4,815,857

[45] Date of Patent: Mar. 28, 1989

[54] METHOD AND APPARATUS FOR MEASURING AN OBJECT

[75] Inventor: Göran Bragd, Värnamo, Sweden

[73] Assignee: Automatverktyg Herbert Bragd AB, Värnamo, Sweden

[21] Appl. No.: 878,541

[22] Filed: Jun. 25, 1986

[51] Int. Cl.$^4$ .............................................. G01B 11/24
[52] U.S. Cl. .................................. 356/372; 356/376; 356/387
[58] Field of Search .............. 356/372, 376, 380, 379, 356/383–387; 250/560, 561

[56] References Cited

U.S. PATENT DOCUMENTS

| | | | |
|---|---|---|---|
| 3,533,701 | 10/1970 | Hrub et al. | |
| 3,806,253 | 4/1974 | Denton | 356/376 |
| 4,122,525 | 10/1978 | Eaton | 356/387 |

FOREIGN PATENT DOCUMENTS

| | | |
|---|---|---|
| 0039143 | 11/1981 | European Pat. Off. |
| 1929775 | 12/1970 | Fed. Rep. of Germany |
| 0388031 | 9/1976 | Sweden |

*Primary Examiner*—F. L. Evans
*Attorney, Agent, or Firm*—Beveridge, DeGrandi & Weilacher

[57] ABSTRACT

A method of measuring, for example, a tube, comprises the steps that the tube is retained in a measurement region which is scanned by light rays. The light rays (35, 36) are displaced in one plane at right-angular directions until eclipses caused by the tube occur and cease. At this point, the displacement of the light sources (37,23; 41, 31) of the light rays (35, 36) and the light receivers (22, 40; 32, 44) is measured, and the eclipses are registered. The plane of scanning of the light rays (35, 36) is displaced at right angles to that plane, the displacement being measured and the process being then repeated.

An apparatus for carrying out the method comprises a retainer (14) for the tube and a foundation (1–5) along which a frame (10–13) is positively movable. The frame encloses the measurement region and is provided with two light sources (37, 23; 41, 31) and two light receivers (22, 40; 32, 44) for emitting two right-angularly displaceable light rays. The frame (10–13) is further provided with measurement means for measuring the positions of the light rays (35, 36). The drive means (15, 16) for the frame (10–13) are further provided with measurement devices for measuring the position of the frame (10–13).

24 Claims, 2 Drawing Sheets

METHOD AND APPARATUS FOR MEASURING AN OBJECT

TECHNICAL FIELD

The present invention relates to a method and an apparatus for measuring an object, for example a bent tube, which is placed in a position in a measurement region, the measurement region being then scanned.

Within many sectors of industry, there is a need for the measurement of three-dimensional objects of highly complicated configurations. As an example of this, mention might be made of the manufacture of exhaust systems for motor vehicles, these being manufactured from tubes which are subsequently bent in a highly irregular and complex manner in order to adhere to the contours of the underbody of the vehicle, to pass around wheel axles, springs and the like. Such an exhaust system may have a large number of bends of different radii and different bending angles and in which, moreover, the bends lie in wholly irregularly oriented planes. It speaks for itself that the measurement, for example for inspection and approval purposes, of tubes bent in this manner is a considerably troublesome operation.

BACKGROUND ART

The prior art abounds with apparatuses for the measurement of irregular obejcts, for example of the type indicated above. These apparatuses have been based on a direct mechanical sensing of the forms and configurations of the object and have often been constructed in such a manner that the object may be locked in a fixed position by means of suitable anchorage devices and that a movable measurement arm provided, for example, with a V block at its free end, is then moved along the tube, the movements of the measurement arm being registered and used as a description of the configuration of the tube.

Machines of the type in which direct mechanical sensing of the object takes place cannot combine rapid measurement with high precision, and particularly not if it is required that the machine be of simple construction at the same time.

PROBLEM STRUCTURE

Thus, the present invention has for its object to realise a method of measuring an irregular object in such a manner that the measurement will be extremely accurate, will be rapid and, moreover, the equipment employed may be manufactured at relatively low cost.

SOLUTION

This object is attained if the method intimated by way of introduction is characterised in that the scanning is effected by means of light rays which, for the scanning of one plane, are displaced in first and second directions making an angle with one another, until eclipses, caused by the object, arise and cease, the displacement of the devices emitting and receiving the light rays being measured, and the eclipses being registered; and that the plane of scan of the light rays is displaced in one direction which makes an angle with the plane, such displacement of the plane being measured.

In order to achieve as brief a measurement time as possible, it suitably applies according to the invention that each light ray in the plane be reciprocated between end positions on either side of the object in the proximity thereof.

It further suitably applies according to the invention that the light rays, within the plane, are guided in directions which are approximately at right angles to one another, and that the displacement of the plane is effected approximately at right angles to the plane.

In order to improve measurement accuracy and, in particular, to eliminate variations, dependent upon the measurement position, in the light intensity impinging upon the light-receiving device, it further suitably applies according to the present invention that the light rays are guided from an immobile light source to a first light deflecting device, through the measurement region, via a second deflecting device, to an immobile light receiver, the light deflecting devices being displaced for the displacement of the light rays, and the light rays being guided in such a manner that their total travel between the light sources and the light receivers is kept constant irrespective of the positions of the light deflecting devices.

In one embodiment of the method according to the present invention, the displacement of the plane is effected stepwise with steps of equal size.

In one alternative embodiment of the method according to the present invention, which may be expected to give a higher degree of measurement accuracy in particularly tightly bent regions on the object, it suitably applies according to the invention that displacement of the plane is effected stepwise, the length of each step decreasing the greater the measured displacement of the light rays in the plane, and vice versa.

In yet a further modification of the method according to the present invention, it applies that the displacment of the plane is effected continually, simultaneously with the light rays' scanning of the plane.

The invention also relates to an apparatus for carrying out the method, the invention having, here, for its object to realise an apparatus which, while being simpler in relation to prior art apparatuses, affords increased measurement precision.

This object according to the present invention is attained by means of an apparatus which comprises a retainer for the object, for placement of the object in a measurement region, and scanning means for scanning the measurement region, the apparatus being characterised in that the scanning means comprises light ray emitting devices and cooperating light receivers; that the light ray emitting devices and light receivers are connected to first drive means disposed on a carrier for the displacement of two light rays in the measurement region, in directions making an angle with one another, the drive means having first measurement devices for measuring the displacement of the light rays; that the carrier is connected to second drive means provided with a second measurement device for measurement of the displacement of the carrier; and that the light receivers and measurement devices are connected to a registration unit for registering eclipses of the light rays caused by the object, as well as registering the positions of such eclipses.

BRIEF DESCRIPTION OF THE ACCOMPANYING DRAWINGS

The nature of the present invention and its aspects will be more readily understood from the following brief description of the accompanying Drawings, and discussion relating thereto.

In the accompanying Drawings:

FIG. 1 is a side elevation of an apparatus for measurement of an irregular object; and FIG. 2 is a section taken along the section line A—A in FIG. 1.

DESCRIPTION OF PREFERRED EMBODIMENT

Figure 1:
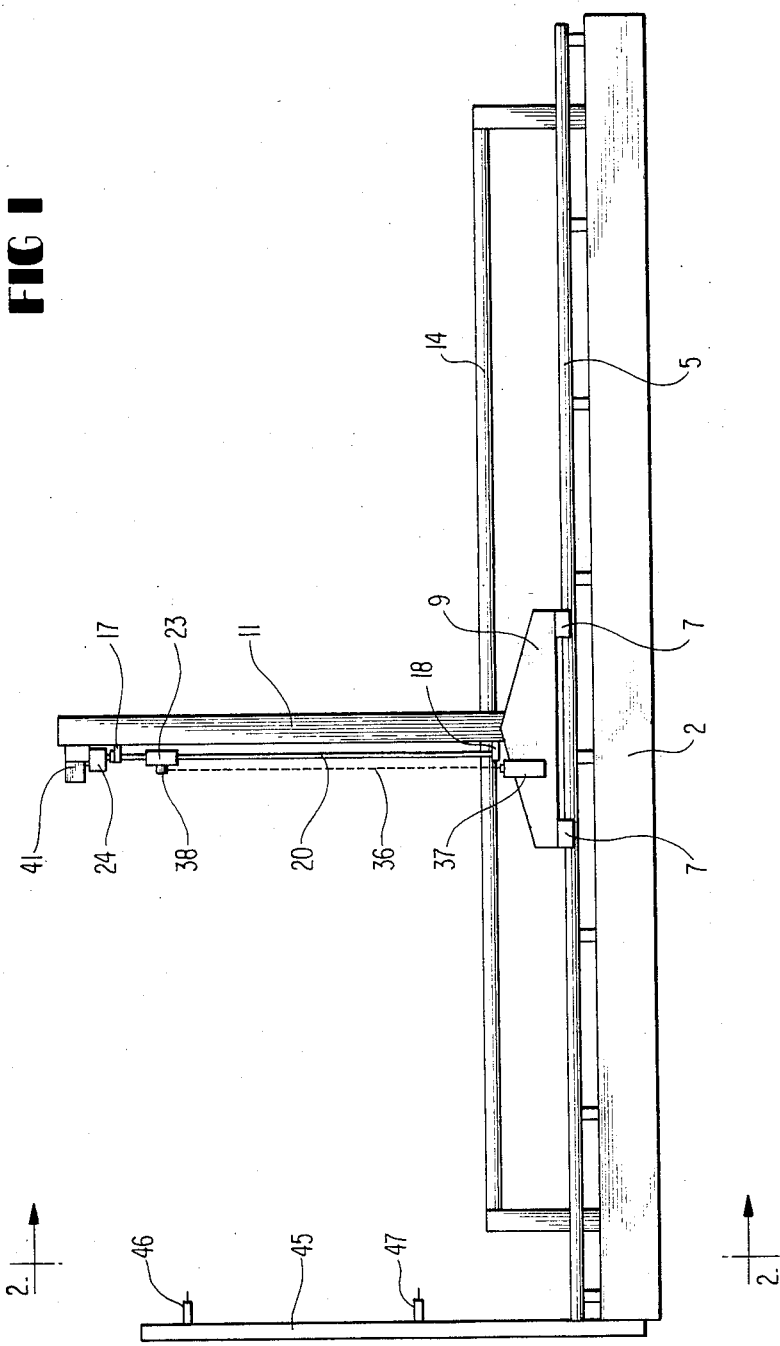

Referring to the Drawings, the measurement apparatus according to the present invention has a foundation with two longitudinal frame beams 1 and 2 and a number of transverse beams 3. While not being apparent from the Drawings, the frame has a number of support and levelling devices, by means of which the frame may, in an extremely accurate manner, be laid on a substrate and aligned to absolute planeness.

Guides 4 and 5 are disposed on the upper side of the longitudinal frame beams 1 and 2 and, in an appropriate embodiment, may be designed as polished, round rods. These two guides cooperate with bearing bushes or similar sliding members 6 and 7 which, wholly without play, are shiftable along both of the longitudinal guides 4 and 5. The bearing bushes 6 and 7 are placed on the underside of two beams 8 and 9 extending in the longitudinal direction of the guides and serving as supports for a vertical, preferably rectangular frame.

Figure 2:
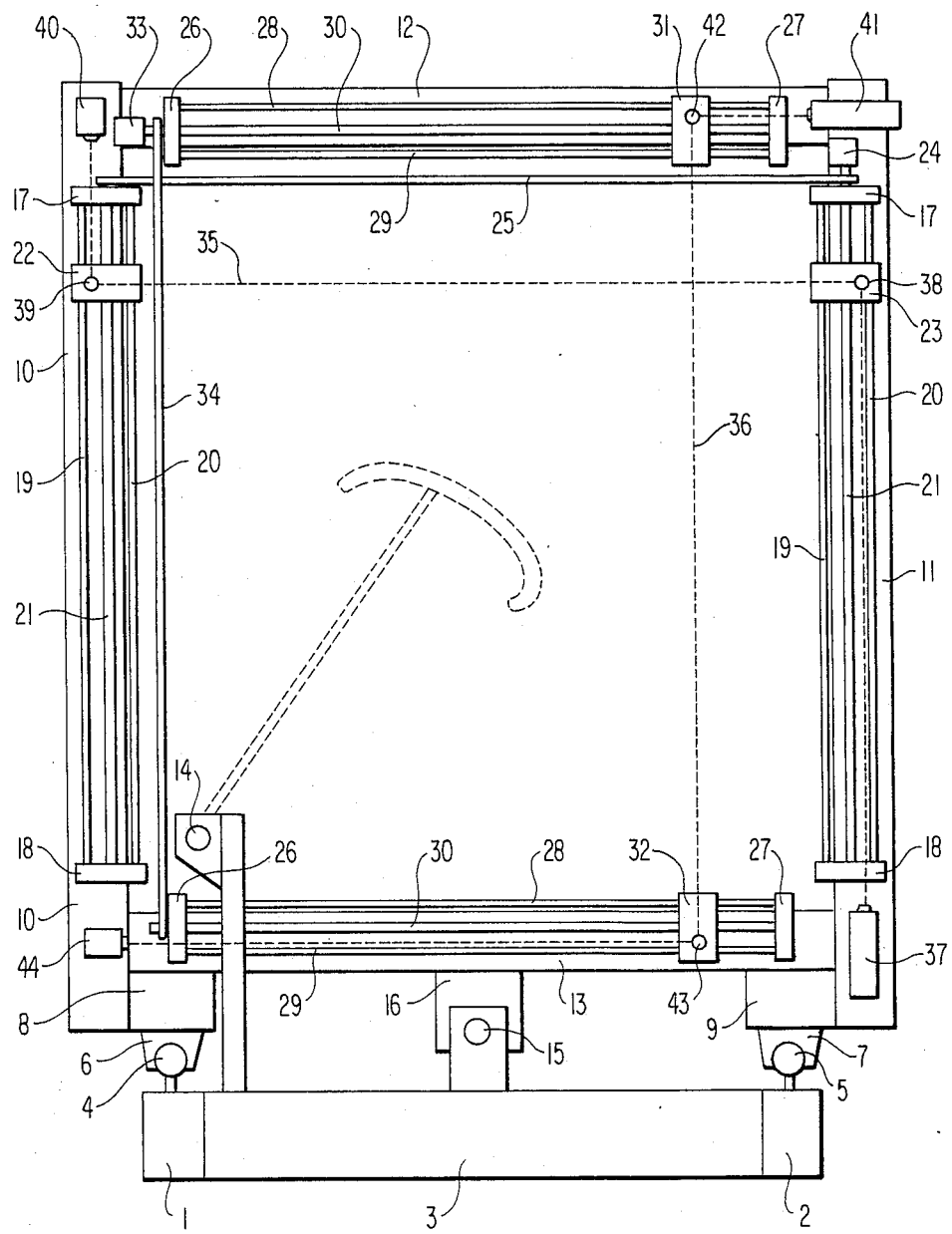

As is most clearly apparent from FIG. 2, the frame includes two lateral uprights 10, 11 and upper and lower cross pieces 12, 13, respectively. In this case, the frame is designed as a rigid unit which, by means of the bearing bushes 6 and 7, is shiftable along the guides 4 and 5. Furthermore, the frame is dimensioned in such a manner as to enclose within its definitions the measurement region which the apparatus according to the present invention is to have. The longitudinal extent of the measurement region is defined by the displacement travel along which the frame may move on the guides 4 and 5.

For fixedly retaining the object which is to be measured in the measurement region, use is made of a longitudinal tube or anchorage 14 which is fixedly mounted in the frame of the measurement apparatus and, so as not to impede the movements of the frame, is located interiorly in relation thereto.

For moving the frame in the longitudinal direction of both of the guides 4 and 5, there is provided a worm gear mechanism which comprises a worm 15 extending in parallel with the two guides 4 and 5 and cooperating with a pre-tensioned, closed nut 16 which is placed on the underside of the bottom cross piece 13 in the frame. The worm 15 is rotated by means of a motor (not shown) which is fitted with an impulse transducer which registers the rotational movement through which the worm passes under the action of the drive motor.

Upper and lower bearing blocks 17 and 18, respectively, are disposed on the lateral uprights 10 and 11 of the frame and serve for the retention of two parallel vertical guide bars 19 and 20, and of worms 21 parallel with the guide bars 19 and 20, the worms being located interjacent of the two guide bars. Runners 22 and 23, respectively, are shiftably disposed along each pair of guide bars 19 and 20 and are provided with a pre-tensioned, closed nut which is in engagement with the worm 21, whereby the runner, on rotation of the worm, is shiftable along the two guide bars 19 and 20.

A drive motor 24 is employed for driving the two worms 21, the motor being also provided with an impulse transducer for registering the angle of rotation of the worms. Both of the worms 21 are, finally, interconnected for synchronous rotation by the intermediary of a cogged belt 25, a chain or some similar device.

Bearing blocks 26 and 27 are also disposed on the two cross pieces 12 and 13 in the frame, in a manner corresponding to that described above. Guide bars 28 and 29 and a worm 30 extend between these bearing blocks. The worm 30 in the upper cross piece 12 is driven by means of a drive motor 33 which is also provided with an impulse transducer for registering the rotational angle of the worm. Furthermore, both of the worms 30 are interconnected by means of a cogged belt 34. Finally, runners 31 and 32 are also disposed on the guide bars 28 and 29 and are provided with pre-tensioned, closed nuts for engagement with the worms 30 so that the runners will thereby be shiftable along the guides bars 28 and 29.

For registering the object (this is intimated in FIG. 2, together with a retainer shown in broken lines), light rays 35 and 36 are used, these being displaceable in two directions making an angle with one another, so that substantially the entire surface of the frame 10-13 may hereby be scanned. Preferably, the light rays 35 and 36 are disposed at right angles to one another and may also preferably—but not necesarily—lie in a common plane.

The first light ray 35, which may be considered as measuring along the Y axis, departs from a light source 37 which is placed in the lower end of the right-hand lateral upright 11 of the frame. This light source may suitably consist of a laser, since this type of light source may emit a substantially parallel beam of rays without any appreciable scatter. From the laser 37, the light ray then passes upwardly in parallel with the two guide bars 19 and 20 up to the runner 23 where is impinges upon a light deflecting device 38 which, for practical reasons, is designed as a so-called pentaprism. From the pentaprism 38, the light beam 35 then passes through the measurement region off to the left-hand runner 22 where it impinges upon a new light deflecting device 39 which is also designed as a pentaprism. In the pentaprism 39, the light ray 35 is then deflected upwardly in a direction which is parallel to the two guide bars 19 and 20, whereafter the light ray impinges, in the upper end of the lateral upright 10, on a light receiver 40.

The use of pentaprisms as light deflecting devices is advantgeous for the reason that such a prism always realises a right angle between the incident and exedent beam, irrespective of whether the prism is pivoted in relation to the rays. This entails that insignificant play in the precision of the two runners 22 and 23 will not lead to any deterioration of the accuracy of measurement, nor will it result in the beam of rays which departs from the pentaprism 39 missing the light receiver 40.

A corresponding situation applies for the light ray 36 which measures in the X axis; i.e. that it departs from a laser 41 which is placed in the upper end of the right-hand lateral upright 11. Thence, the light ray passes horizontally to the upper runner 31 and impinges upon a pentaprism 42 located thereon. Thence, the light ray 36 is deflected vertically downwardly and impinges upon another pentaprism 43 on the lower runner 32 whence the light ray is deflected at right angles in the horizontal direction and impinges upon a light receiver 44 at the lower end of the left-hand lateral upright 10 in the frame.

By activating the two driving motors 24 and 36, it is possible to move the runners 22 and 23; and 31 and 32, respectively, in such a manner that both of the light rays 35 and 36 are displaced for scanning the entire measurement region in one plane which is substantially paralell to the plane of extent of the frame 10-13.

In order to reduce the disturbance sensitivity of the measurement apparatus to stray (or 'maverick') light, light rays are employed within a very narrow wave length range. If the two light receivers 40 and 44 are, by the employment of narrow band filters, blinded or at least substantially blinded to such light as derives from background illumination of wavelengths falling outside that of the light rays in guestion, this means that the background illumination will occasion such a slight extra lightcast within the narrow wavelength range of the light rays employed that external effects from background illumination are negligible.

As will have been apparent from the foregoing, the measurement method according to the present invention is based on a scanning of a measurement region by means of light rays. In such operation, an eclipse of the light rays will be registered in one of the two light receivers 40 and 44. Since the light rays move, the light intensity in the two light receivers 40 and 41, when light ray eclipse occurs, will fade gradually, according as the light ray impinges on the measurement object, finally to black-out entirely when the measurement object totally obscures the light ray. Hence, this entails that the two light receives 40 and 44 will receive an analog signal but that the sought-for objective is a discrete output signal which is emitted at exactly the right moment the analog varying input signal has reached a predetermined level. Naturally, the point in time for emission of the output signal from the two light receivers 40 and 44 will influence measurement accuracy.

Since the light intensity in a diverging light ray fades with the square of the distance to the light source, possible variations in the length of the light ray will also be of importance for the output signal from the light receivers 40 and 44. This problem has been obviated according to the present invention in that lasers are employed as light sources, since lasers emit as good as parallel light beams which, as a result, will hardly run the risk of falling outside the light-sensitive surface of the light receiver, with the result that the incident energy is hardly affected. Moreover, the light rays are always guided in such a manner that their total travel between light source and receiver is the same irrespective of the positions of the runners 22, 23; 31, 32. A further safety measure in this context is that the devices which emit and receive the light rays on their passage through the measurement region have been designed such that the light ray will always lie within the sensitivity range of the sensors, whereby variations in light volume caused by lateral displacements of the light rays, will be eliminated. This is effectuated by means of the above-disclosed employment of the pentaprisms and as a result of the fact that the cross-sectional area of the light rays is smaller than the operatively active surfaces of the sensors.

Since the measurement apparatus according to the present invention is to be used for long periods of time and, moreover, in an industrial environment, it is not entirely possible to safeguard against the risk that the optical components in the measurement apparatus be obfuscated or clouded by dirt with the passage of time. Naturally, this also involves some effect on the incident analog signal impinging on the light receivers 40 and 44, which would entail that a clouding of the optical components would influence measurement accuracy.

In order to eliminate the above-outlined drawbacks, use is made, according to the invention, of a calibration frame 45 disposed in one end of the foundation, the frame having four measurement points 46 and 47 in the form of pins (only two being shown on the Drawing) which are used for calibration of the measurment apparatus. These measurement points are disposed at the corners of a square, the square having been tilted somewhat about an axis which is parallel to the two longitudinal guides 4 and 5 so that the two upper measurement points 46 will thereby lie on slightly different heights, a situation which correspondingly applies for the two lower measurement points 47. Further, the two superposed measurement points 46 and 47 will, naturally, assume positions which are offset to some degree in a direction at right angles to the plane of the Drawing in FIG. 1. Since the exact position and dimensions of the four pins 46 and 47 are absolute knowledge, it is possible to calibrate the measurement apparatus by check-off measurement against these pins. In this instance, the reaction thresholds of the sensors may, naturally, be calibrated so that any possible changes to the light volume which impinges on the sensors may be compensated for.

The mechanical and optical components of the subject matter of the present invention have been described above. These components are used for gathering measurement data which may then be processed in a processing unit - normally consisting of a computer.

Thus, all impulse tranducers connected to the drive motors 24 and 33 are hooked up to this host computer, as is also the case for the impulse transducer disposed on the worm 15. As a result, the computer receives, via the impulse transducers, information on the spatial locations of the light rays 35 and 36.

Further, the light receivers 40 and 44 are, naturally also on-line with the computer, with the result that the computer is also informed of eclipse of the light rays.

Using the measured data as a point of departure, the computer then calculates the form and configuration of the measured object with a very high degree of accuracy, and the form of the measured object may be displayed in a number of different alternative presentations, for example in the form of dimension sheets, in the form of graphic representations, or in the form of master data for an automatically operating tube bending machine.

When the above-described measurement apparatus is put into operation, the object which is to be measured is placed on the retainer 14, such that the object is located interiorly of the frame 10-13. It should here be observed that the object is placed in such a position that, viewed along the light rays 35 and 36, no portions of the object may conceal other portions of the object.

Once the object which is to be measured is placed and secured in the measurement apparatus, the frame 10-13 is run to its left-hand end position illustrated in FIG. 1, and calibration is effected by check-off measurement against the measurement points 46 and 47. Thereafter, the measurement process proper begins, which entails that the light rays 35 and 36 are reciprocated over the measurement region so that eclipses of the light rays occasioned by the object are registered, as well as the positions of such eclipses. The guide equipment for the measurement apparatus is designed in such a manner that the direction of displacement of the two light rays 35 and 36 is switched immediately after an eclipse has taken place and been ended. Hereby, the two light rays 35 and 36 need not cover longer movement travels than is necessary, which entails that measurement time is reduced.

The measurement process proper may be executed in a number of different alternative ways, one entailing that the frame 10-13 is held stationary while scanning by means of the light rays 35 and 36 takes place. Only when such a scanning has been completed is the frame 10-13 moved a predetermined distance, whereafter a new scanning of the measurement object is effected.

In this operation, the length movement which the frame 10-13 undergoes may be kept constant, but may, naturally, also be varied in such a manner tht the movement extent is made larger in such regions where the measurement object displays no markedly tight bending. On the other hand, movement of the frame 10-13 must be effected with very short steps in such regions where the measurement object displays a considerable amount of bending, if measurement precision is to be sufficient. One such variation of the displacement steps for the frame 10-13 is realised by control impulses retrieved from the computer.

As one further alternative measurement process, mention might be made of such a stepwise relative displacement between the frame and the measurement object as realises equidistant measurement points also along the curved portions of the measurement object. To this end, it may, in certain positions, be necessary first to execute a relative movement along a certain distance and then a minor retractory movement, this 'two-steps-forward-one-step-back' procedure being thereafter continued.

Alternatively, the frame 10-13 may, of course, be run continually along the guides 4 and 5 at the same time as the two light rays 35 and 36 scan the measurement region. Naturally, it is also possible in this case to modify the relationship between the running speeds of the light rays and the measurement speed of the frame 10-13, the frame being moved proportionately more quickly in such sectors of the measurement object as display relatively slight curvature, while, on the other hand, the speed of movement of the frame 10-13 is, of necessity, greatly reduced in such sectors of the measurement object as display tight bends and curvature.

Naturally, it is further possible to vary, in the same manner, the mutual speeds of displacement of the two light rays 35 and 36.

In one alternative embodiment, the two lasers 37 and 41 are movably disposed directly on the runners 23 and 31, respectively, while the sensors 40 and 44 are mounted on the runners 22 and 32, respectively. Also in this embodiment, the total length of travel of the light rays will be indepedent of the measurement position.

The present invention may be further modified without departing from the spirit and scope of the appended claims. Thus, it is also possible to keep the frame 10-13 immobile during the measurement process and instead place the measurement object on a carriage which is moved in relation to the frame during the measurement operation. In such an instance, the movements of the carriage must, of course, be executed and registered in the same manner as has been described above for the frame.

What we claim and desire to secure by Letters Patent is:

1. A method of measuring an object comprising the steps of:

placing the object in a position in a measurement region to be scanned, scanning the measurement region by means of light rays (35, 36) which, for scanning one plane, are displaced in a first and a second direction, making an angle with one another, until eclipses caused by the object have occurred and ceased, registering the eclipses, the light rays (35, 36) being guided from a light source (37, 41) to a first light deflecting device (38, 42), through the measurement region, to a second light deflecting device (39, 43) and to a light receiver (30, 44) said scanning step comprising displacing the light deflecting devices for movement of the light rays, the light rays being guided in such a manner that their total travel between light sources and light receivers is kept constant irrespective of the positions of the light deflecting devices, measuring the displacement of the light deflecting devices, displacing the plane of scanning by the light rays in a direction which makes an angle with the plane, and measuring the displacement of the plane 2. The method as claimed in claim 1, wherein each light ray (35, 36) in the plane is reciprocated between end positions on either side of the object in the proximity thereof.

3. The method as claimed in claim 1 wherein the light rays (35, 36) within the plane are guided in directions approximately at right angles to one another and that the displaced of the plane is effected approximately at right angles to the plane.

4. The method as claimed in claim 1 wherein the displacement of the plane is effected stepwise, with steps of equal size.

5. The method as claimed in claim 1, wherein the displacement of the plane is effected stepwise, the length of each step being reduced the greater the measured displacement of the light rays (35, 36) within the plane, and vice versa.

6. The method as claimed in claim 1, wherein displacement of the plane is effected continually, simultaneous with the scanning of the plane by the light rays (35, 36).

7. The method of claim 1 wherein the light rays are guided to scan measuring points of known sizes and positions to establish magnitudes for output signals from the light receivers for registration of an occurrence and ceasing of an eclipse.

8. The method of claim 1 wherein the directions of the light rays are kept constant of either sides of the light deflecting devices irrespective of disalignments thereof.

9. The method of claim 1 wherein the light of the light rays is within a narrow spectral grange and the devices receiving the light rays are substantially insensitive to light outside said narrow spectral range.

10. An apparatus for measuring an object comprising a retainer (14) for retaining the object in a measurement region, and scanning means for scanning the measurement region, wherein the scanning means includes devices (37, 39; 41, 42) for emitting light rays (35, 36) and cooperating light receivers (39, 40; 43, 44); the light ray emitting devices and the light receivers are connected to first drive means (22, 23; 31, 32) disposed on a carrier (10-13) for displacement of two light rays (35, 36) in the measurement region, in directions making an angle with one another, each of the light ray emitting devices including a light source and a first light deflecting device in association with a second light deflecting device and a sensor of an associated light receiver, the carrier and said first drive means locating each associated light source, first light deflecting member, second light deflecting member and sensor whereby the total light travel distance between each associated light source and sensor is constant irrespective of the positions of the light deflective devices on the carrier, said drive means having first measurement devices for measuring the displacement of the light rays; the carrier is connected to second drive means (15) provided with further measurement devices for measuring the displacement of the carrier; and said light receivers and said measurement devices are connected to a register unit for registering eclipses of the light rays occasioned by the object, and positions of such eclipses.

11. The apparatus as claimed in claim 10, wherein the carrier (10-13) is in the form of a frame enclosing the measurement region, the frame being movable, along a guide (4,5) in the longitudinal direction of the measurement region; and the light deflecting devices are pairwise movable along guides (19, 20; 28, 29) on the frame for guiding two light rays (35, 36) at right-angled directions through the measurement region.

12. The apparatus as claimed in claim 11 wherein the two light deflecting devices (38, 39; 42, 43) which each guide their light ray (35, 36) through the measurement region are disposed at opposing edges of the frame and are connected to drive means (24, 25; 33, 34) for the synchronous driving in the same directions along their guides, associated light sources (37, 41) and sensors (40, 44) being located on opposite sides of parts of the light rays permeating the measurement region.

13. A method of measuring an object comprising the steps of:
placing the object in a position in a measuring region;
scanning said region by means of light rays which, for scanning a plane, are displaced in a first and a second direction making an angle with one another, until an eclipse caused by the object has occurred and ceased;
registering the positions of the eclipses by means of light receivers, said light receivers producing an output signal depending on the amount of light received;
displacing the plane of scanning in a direction making an angle with the plane and measuring the displacement of the plane; and
setting the levels of the output signals necessary to cause registration of occurrence and ceasing of the eclipse by having the rays scan measuring points of known sizes and positions.

14. The method of claim 13 wherein the light rays are emitted from light sources and received by said light receivers and guided between associated light sources and light receivers so as to keep the total travel distances of the rays constant irrespective of the positions of the light rays in the plane.

15. The method of claim 13 wherein the light of the rays is within a narrow spectral range and the light receivers are substantially insensitive to light outside said narrow spectral range.

16. A method of measuring an object comprising the steps of:
placing the object in a position in a measuring region;
scanning said region by means of light rays which, for scanning a plane, are displaced in a first and a second direction making an angle with one another, until an eclipse caused by the object has occurred and ceased;
registering the positions of the eclipses;
each light ray being emitted by a light source and received by a light receiver, said light rays further being guided through the measuring region by means of two light deflecting devices which are moved in synchronism, each light deflecting device being adapted to allow disalignments thereof without changing the direction of the light ray on either side of the light deflecting device;
displacing the plane of scanning in a direction which makes an angle with the plane; and
measuring the displacement of the plane of scanning 17. The method of claim 16 wherein the light rays are guided so that their total travel distance between associated light sources and light receivers is kept constant irrespective of the positions of the light deflecting devices.

18. An apparatus for measuring an object comprising:
a frame member having a retainer for retaining the object to be measured in a measuring region;
a scanning means movable along said frame member for scanning the measuring region by means of light rays forming an angle with one another;
measuring means for registering the position of said scanning means;
said scanning means having light sources, light receivers and light deflecting devices for guiding the light rays through the measuring area;
said light sources, said light receivers and said light deflecting devices being arranged for guiding the light rays so that the total travel distance of the light rays is kept constant irrespective of the positions of the light rays; and
means connected to the light receivers for registering the occurrence and ceasing of eclipses caused by the object.

19. The apparatus of claim 18 wherein the scanning means includes a frame enclosing the measuring area, the light sources and the light receivers being immobile on said frame, said light deflecting devices being connected to drive means on the frame and pairwise movable along opposing sides thereof 20. The apparatus of claim 18 wherein the light deflecting devices includes penta prisms for maintaining the directions of the light rays independent of misalignments of the deflecting devices.

21. The apparatus of claim 18 wherein the frame has fixed measuring points which have known sizes and known positions for scanning by the light rays for calibrating the apparatus.

22. The apparatus of claim 18 wherein the light from the light sources is within a narrow range of wavelengths and the light receivers are substantially insensitive to light outside of said narrow range.

23. A method of measuring an object located in a measurement region; said method comprising the steps of:
guiding a first light ray from a light source means through the measurement region by a first light deflecting device and to a first associated light receiver by a first associated light deflecting device;
guiding a second light ray form the light source means through the measurement region by a second light deflecting device and to a second associated light receiver by a second associated light deflecting device so that the total distance travelled by the first and second light rays between the light source means and their associated light receivers is constant irrespective of the positions of the light deflecting devices;

moving the first deflecting devices to cause the first light ray to scan in a plane;

moving the second deflecting devices to cause the second light ray to scan in said plane, at an angle with respect to the first light ray;

detecting eclipsing of the light rays by the object and cessation of such eclipsing;

recording the path of movement of the deflecting devices and the locations of eclipses and cessations of eclipses; and moving the light of source means, the deflecting devices and the light receivers in a direction at an angle with said plane.

24. An apparatus for measuring an object comprising:

a frame having means for retaining an object in a measurement region;

a first light source for providing a first light ray;

a second light source for providing a second light ray;

a first light receiver associated with the first light source for detecting the first light ray and providing a first light detection signal indicative thereof;

a second light receiver associated with the second light source for detecting the second light ray and providing a second light detection signal indicative thereof;

scanning means, movable along the frame, for directing the light rays to intersect at an angle within a plane of measurement in the measurement region, said scanning means including first associated light deflecting means for directing the first light ray through the measurement plane and to the first associated receiver and second associated light deflecting means for directing the second light ray through the measurement plane to the second associated receiver, the light deflecting means maintaining a constant travel distance for the first light ray between its associated light source and receiver and for the second light ray between its associated light source and receiver;

means for detecting the position of the scanning means; and means determining occurrences and cessations of eclipses of the light rays by the object from the light detection signals

* * * * *